United States Patent
Remond et al.

(10) Patent No.: US 9,981,737 B2
(45) Date of Patent: May 29, 2018

(54) METHOD OF FASTENING AN AIRCRAFT WHEEL DRIVE MEMBER ON AN UNDERCARRIAGE CARRYING A WHEEL

(71) Applicant: MESSIER-BUGATTI-DOWTY, Velizy-Villacoublay (FR)

(72) Inventors: Sebastien Remond, Velizy-Villacoublay (FR); Edouard Campbell, Velizy-Villacoublay (FR); Thierry Blanpain, Velizy-Villacoublay (FR); Alexis Tovar, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 180 days.

(21) Appl. No.: 13/975,592

(22) Filed: Aug. 26, 2013

(65) Prior Publication Data
US 2014/0075739 A1   Mar. 20, 2014

(30) Foreign Application Priority Data

Sep. 17, 2012   (FR) ..................................... 12 58715

(51) Int. Cl.
*B64C 25/36* (2006.01)
*B64C 25/40* (2006.01)

(52) U.S. Cl.
CPC ............ *B64C 25/405* (2013.01); *B64C 25/36* (2013.01); *Y02T 50/823* (2013.01); *Y10T 29/49826* (2015.01); *Y10T 29/49948* (2015.01)

(58) Field of Classification Search
CPC ......... Y10T 29/49948; Y10T 29/49947; Y10T 29/49899; B64C 25/36
See application file for complete search history.

(56) References Cited

U.S. PATENT DOCUMENTS

| | | | | |
|---|---|---|---|---|
| 4,537,449 A | * | 8/1985 | Hayashi | B60B 3/002 301/35.629 |
| 6,354,408 B1 | * | 3/2002 | Bailey | B60T 1/065 188/73.39 |
| 2011/0156472 A1 | * | 6/2011 | Bucheton | B64C 25/405 301/6.2 |
| 2011/0297786 A1 | | 12/2011 | Sweet et al. | |

FOREIGN PATENT DOCUMENTS

EP    2 243 703 A1    10/2010

OTHER PUBLICATIONS

French Search Report, FR 1258715, dated May 3, 2013.

* cited by examiner

*Primary Examiner* — Jason L Vaughan
*Assistant Examiner* — Amanda Meneghini
(74) *Attorney, Agent, or Firm* — Sughrue Mion, PLLC

(57) ABSTRACT

The invention provides a method of mounting an aircraft wheel drive member (30) on an undercarriage having an axle (1) that carries the wheel and that is provided with a torque plate (3) having an outside face against which a brake can be fitted, the method comprising the steps of fitting a support (10) that bears against an inside face of the torque plate opposite from its outside face against which a brake (2) is fitted, and of fitting the drive member on the support.

9 Claims, 9 Drawing Sheets

METHOD OF FASTENING AN AIRCRAFT WHEEL DRIVE MEMBER ON AN UNDERCARRIAGE CARRYING A WHEEL

The invention relates to a method of mounting an aircraft wheel drive member on an undercarriage carrying a wheel.

BACKGROUND OF THE INVENTION

It is becoming more and more the practice to provide the wheels carried by undercarriages of the main landing gear of an aircraft with drive members suitable for enabling the aircraft to move under its own power, but without requiring drive from its engines. Such wheels are generally fitted with brakes that comprise (hydraulic or electromechanical) braking actuators carried by an actuator-carrier or ring, and a torsion tube around which a stack of disks is arranged.

The brakes are usually mounted around the axle carrying the wheel and they are associated with the undercarriage in several ways. They are simple to mount rotatably on the undercarriage, and to prevent from rotating on the axle either by a brake bar (as in the Airbus A340), or by a dog secured to the undercarriage (as in the Boeing B737). The brake may also be fastened to a torque plate, i.e. to a plate made integrally with the axle (as in the Airbus A320), and as shown in FIG. 6, which is described in greater detail below.

Document FR 2 954 752 proposes fastening such a drive member directly on the brake ring. However that arrangement makes it necessary to modify existing brakes or to design new brakes in order to enable the drive member to be incorporated therein.

A need has been identified for providing a drive member that is independent of the brake, thereby facilitating maintenance of both of those two elements, and also making it possible for the drive member to be made available as an option.

OBJECT OF THE INVENTION

An object of the invention is to provide a method of mounting an aircraft wheel drive member on an undercarriage carrying a wheel, which drive member is particularly adapted to an undercarriage in which the axle(s) is/are fitted with torque plate(s).

SUMMARY OF THE INVENTION

In order to achieve this object, the invention provides a method of mounting an aircraft wheel drive member on an undercarriage having an axle that carries the wheel and that is provided with a torque plate having an outside face against which a brake can be fitted, the method comprising the steps of fitting a support that bears against an inside face of the torque plate opposite from its outside face, and of fitting the drive member on the support.

The term "outside" is used to designate the face of the torque plate that faces towards the end of the axle and against which the brake is fitted, and the term "inside" is used to designate the face of the torque plate that faces towards the strut or the rocker arm that carries the axle.

Thus, the inside face of the torque plate is used for receiving a support that is capable, in turn, of receiving the drive member. Such mounting is completely compatible with an existing brake, and avoids any modification to the undercarriage in order to receive said drive member.

In another particular aspect of the invention, the support is fastened on the torque plate by using at least one bolt having a threaded shank on which a nut is fitted to clamp together the support and the torque plate between a head of the shank and the nut, the bolt shank including a bearing surface for centering it in an orifice of the torque plate in which it is inserted.

BRIEF DESCRIPTION OF THE DRAWINGS

The invention can be better understood in the light of the following description of particular, nonlimiting embodiments given with reference to the figures of the accompanying drawings, in which.

DETAILED DESCRIPTION OF THE INVENTION

Figure 6:
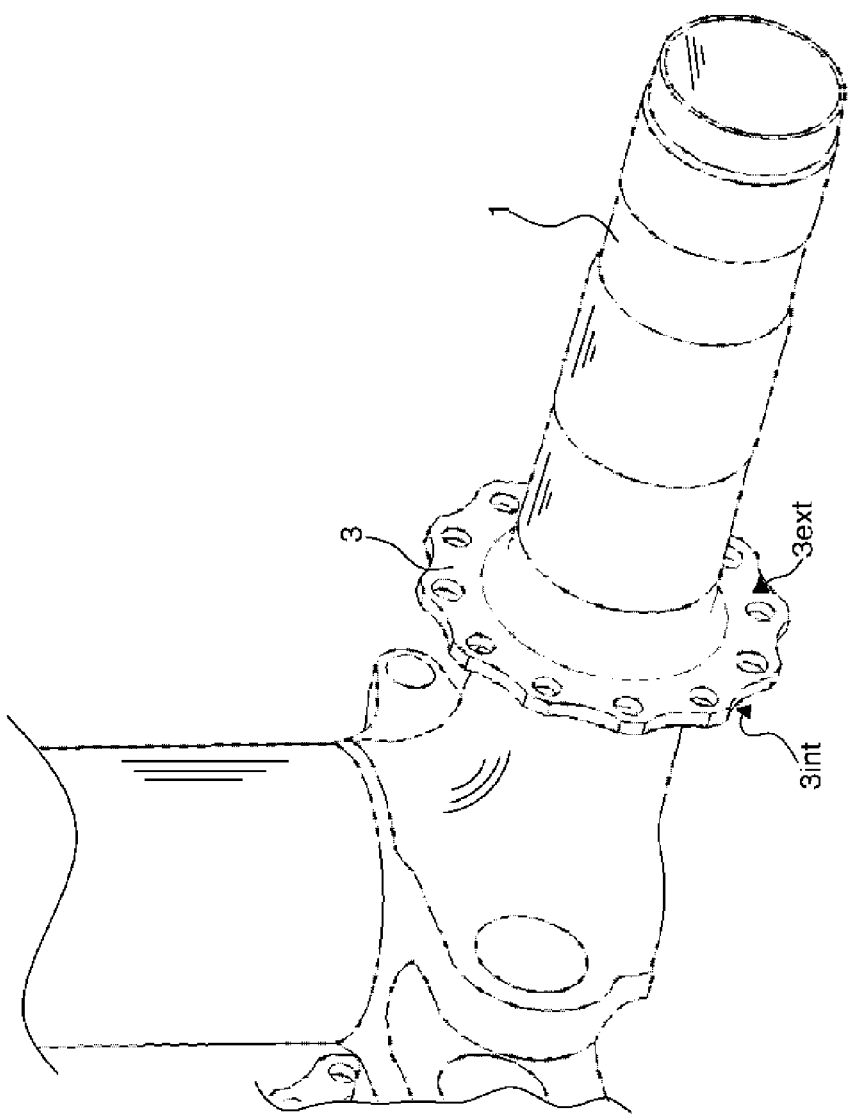
FIG. 6 is a perspective view of a prior art undercarriage provided with an axle having a torque plate.

The invention is intended more particularly for aircraft undercarriages of the kind shown in FIG. 6 and including an axle 1 that is to receive a wheel (not shown herein). In known manner, the wheel is rotatably fitted on the axle by means of two conical roller bearings, a nut screwed onto the end of the axle serving to prevent the wheel from moving axially and applying pre-stress to the bearings. Prior to putting the wheel into place on the axle, a brake is mounted on the axle in order to be fastened against the outside face 3ext of a torque plate 3 by means of bolts. This is well-known and is recalled for information purposes only.

Figure 1:
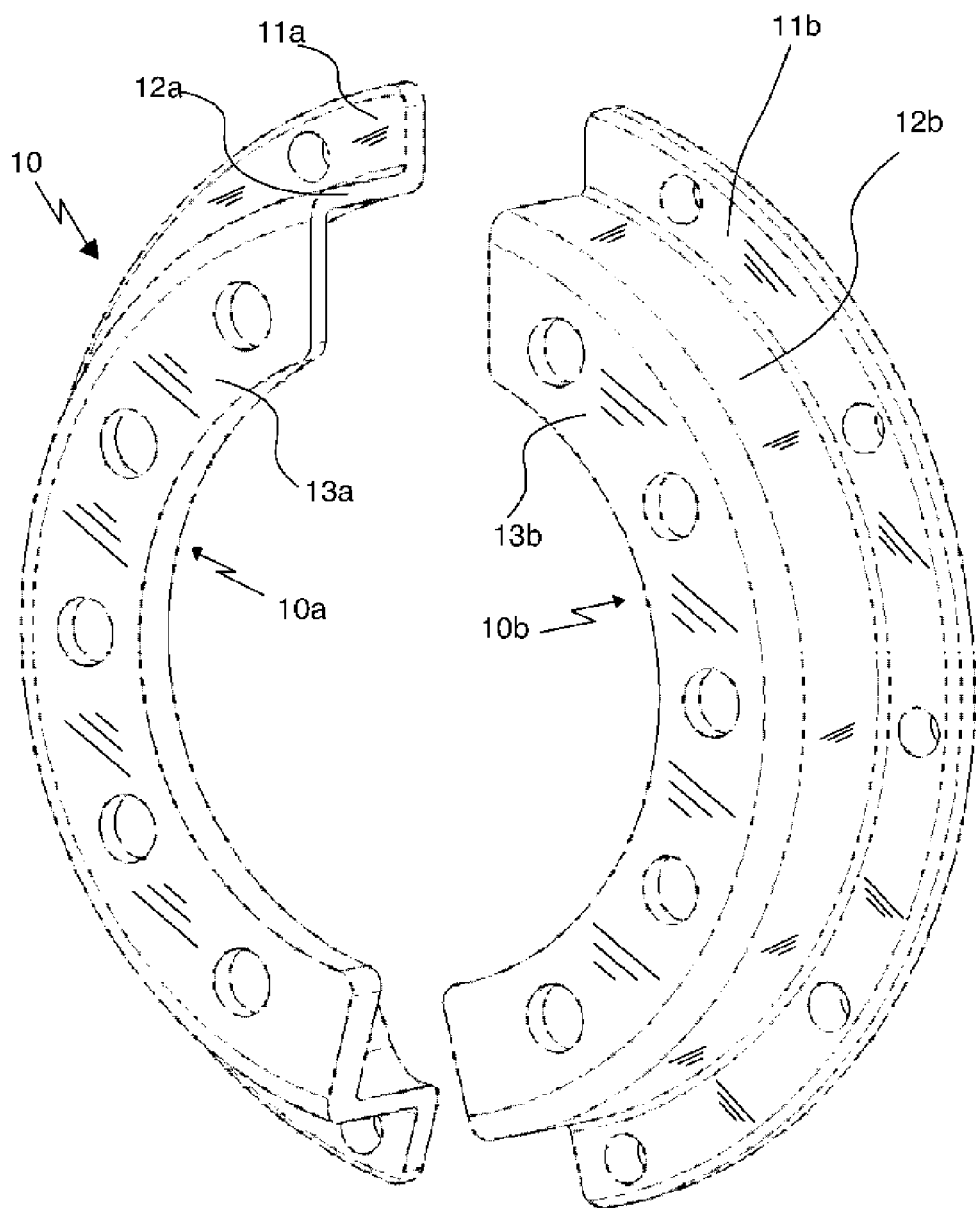
FIG. 1 is a perspective view of a two-part support in a first particular embodiment of the invention.
Figure 2:
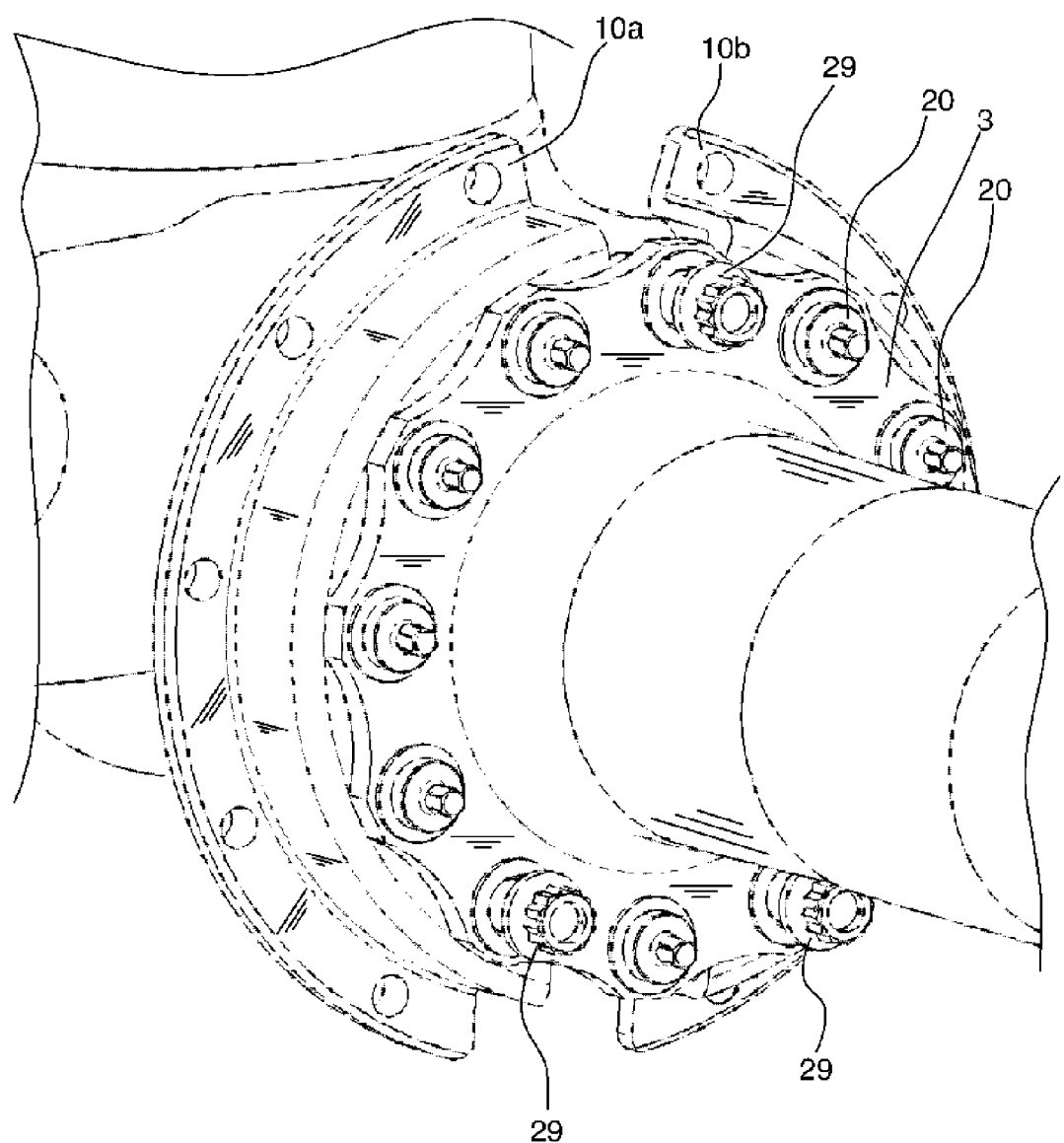
FIG. 2 is a perspective view of the FIG. 1 support in place on the torque plate of the undercarriage.

One of the objects of the invention is to enable a member for driving the wheel in rotation to be fastened without reconsidering the architecture of the undercarriage or of the brake. In a first embodiment of the invention as shown in FIGS. 1 to 5, a support 10 is fitted to the undercarriage, which support 10 is as shown in FIG. 1, where it is shown as being made up of two half-supports 10a and 10b. Each half-support 10a, 10b has an outer collar 11a, 11b that is pierced in order to receive fastener bolts for fastening the rotary drive member. Each outer collar 11a, 11b is held by a skirt 12a, 12b, which is itself terminated by an internal collar 13a, 13b that is likewise pierced in order to receive the fastener bolts of the half-supports 10a, 10b on the torque plate 3. In FIG. 2, there can be seen the half-supports 10a, 10b bolted to the torque plate 3 so as to bear against the inside face 3int of the torque plate 3, i.e. the face opposite from the face against which the brake 2 presses.

Figure 3:
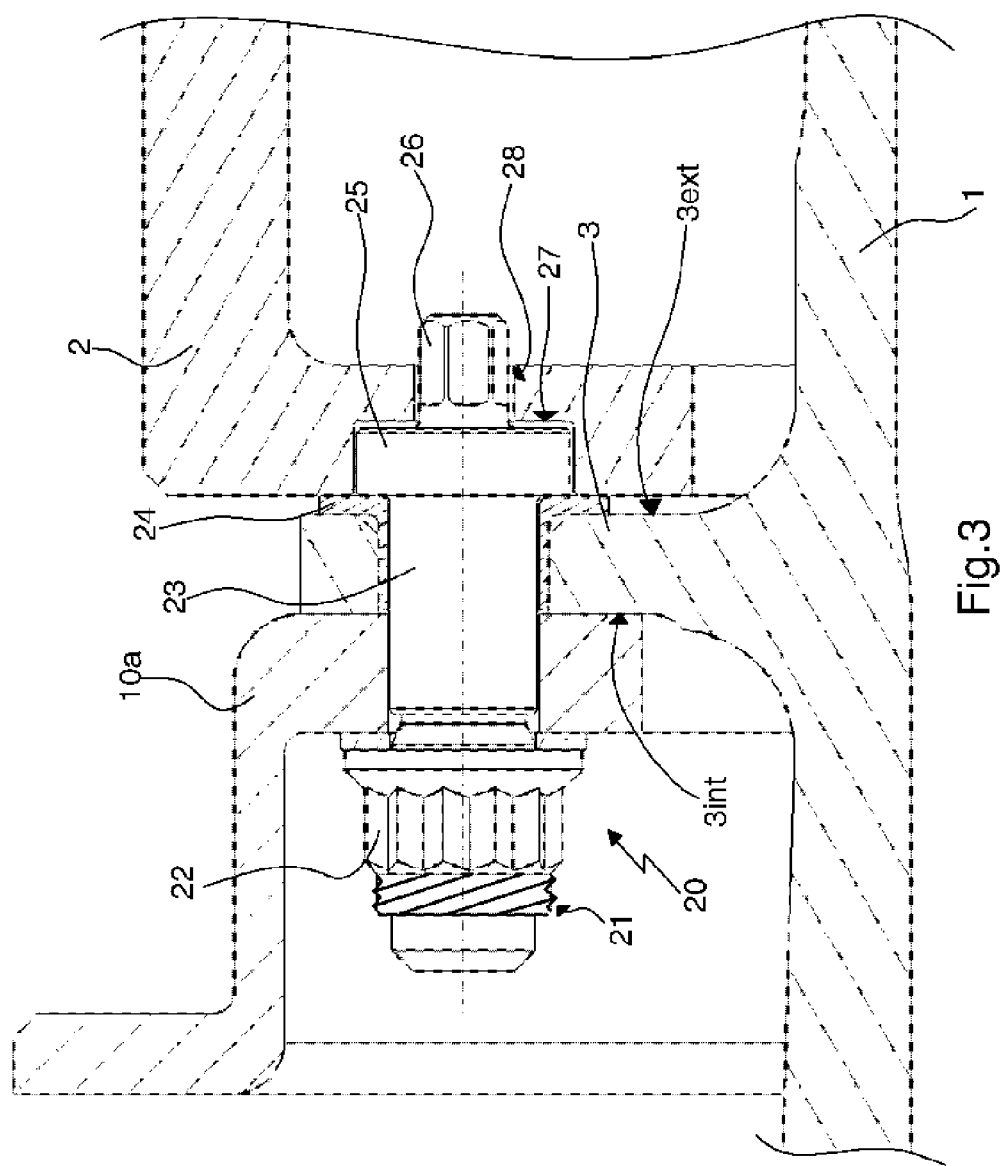
FIG. 3 is a perspective view in section through one of the bolts for fastening of the FIG. 1 support on the torque plate.
Figure 4:
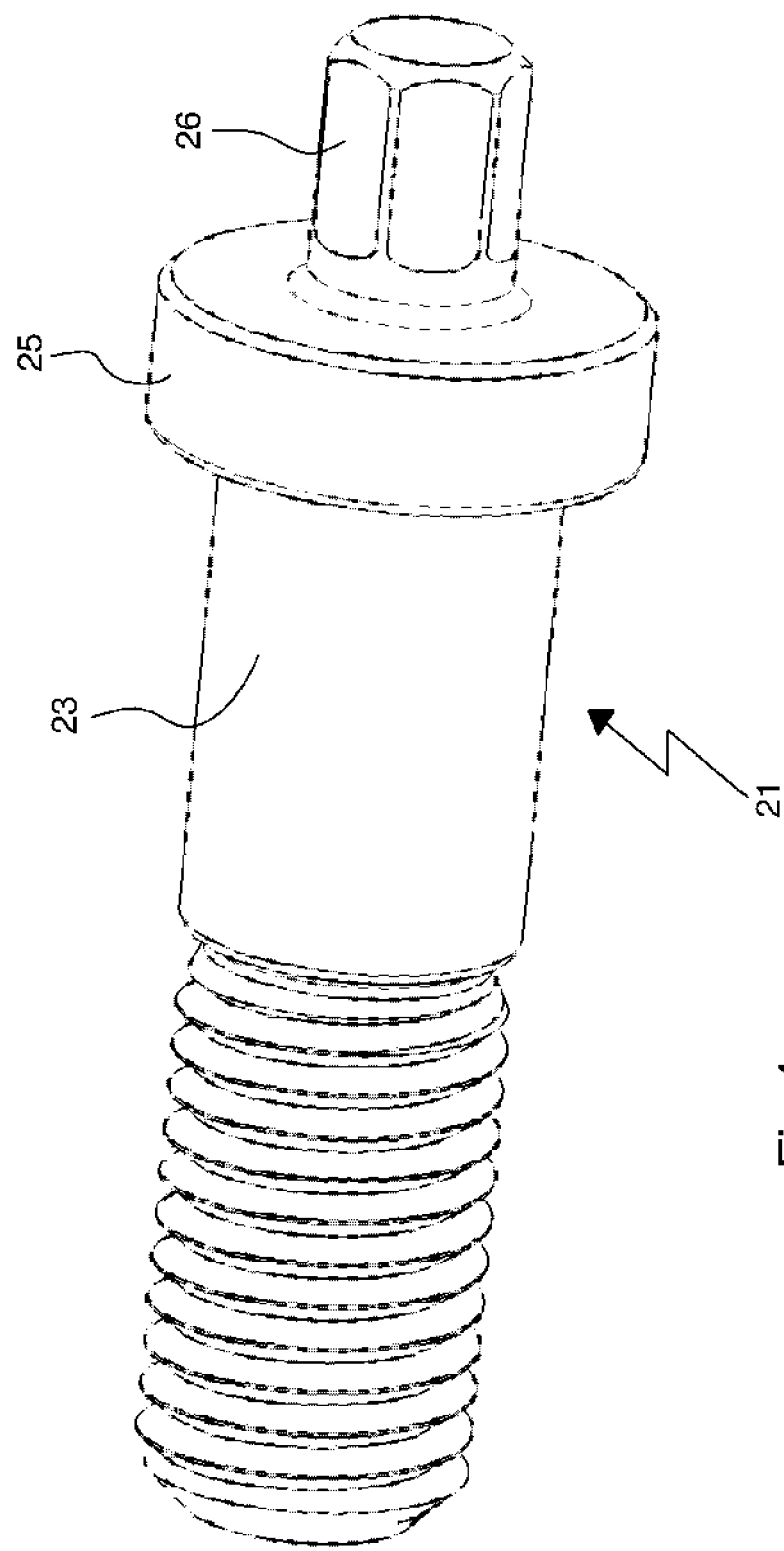
FIG. 4 is a perspective view of the shank of the bolt shown in FIG. 3.

As can be seen more particularly in FIGS. 3 and 4, the bolts 20 for fastening the half-supports 10a, 10b to the torque plate 3 comprise a bolt shank 21 with a threaded end onto which a nut 22 is fitted, beside the half-support. The bolt shank 21 also has a centering bearing surface 23 that co-operates with a bushing 24 in order to be centered in the orifice in the torque plate 3 in which the bolt shank 21 is engaged. At its other end, the bolt shank 21 carries a head 25 that bears against the outside face of the torque plate 3 (in this example via a collar of the bushing 24), so that the support and the torque plate are clamped between the head 25 and the nut 22. To this end, and as can be seen in FIG. 3, the rear face of the brake presents spot faces 27 for receiving the heads 25 of the facing bolt shanks 21 with little circumferential clearance, thereby enabling the rear face of the brake 2 to press against the torque plate. In this example, the head 25 acts as to position the brake relative to the torque plate 3. As can be seen more particularly in FIG. 4, the head 25 carries a stud 26, in this example a substantially hexagonal stud, that projects therefrom in order to make it easier to put the bolt 20 into place. At the bottom of each spot face 27 there extends an orifice that is adapted to receive the stud 26. The brake 2 is fastened to the torque plate by bolts 29 (visible in FIG. 2) that are mounted in the opposite direction to the mounting direction of the bolts 20 that are used for fastening the support 10 to the torque plate 3.

Figure 5:
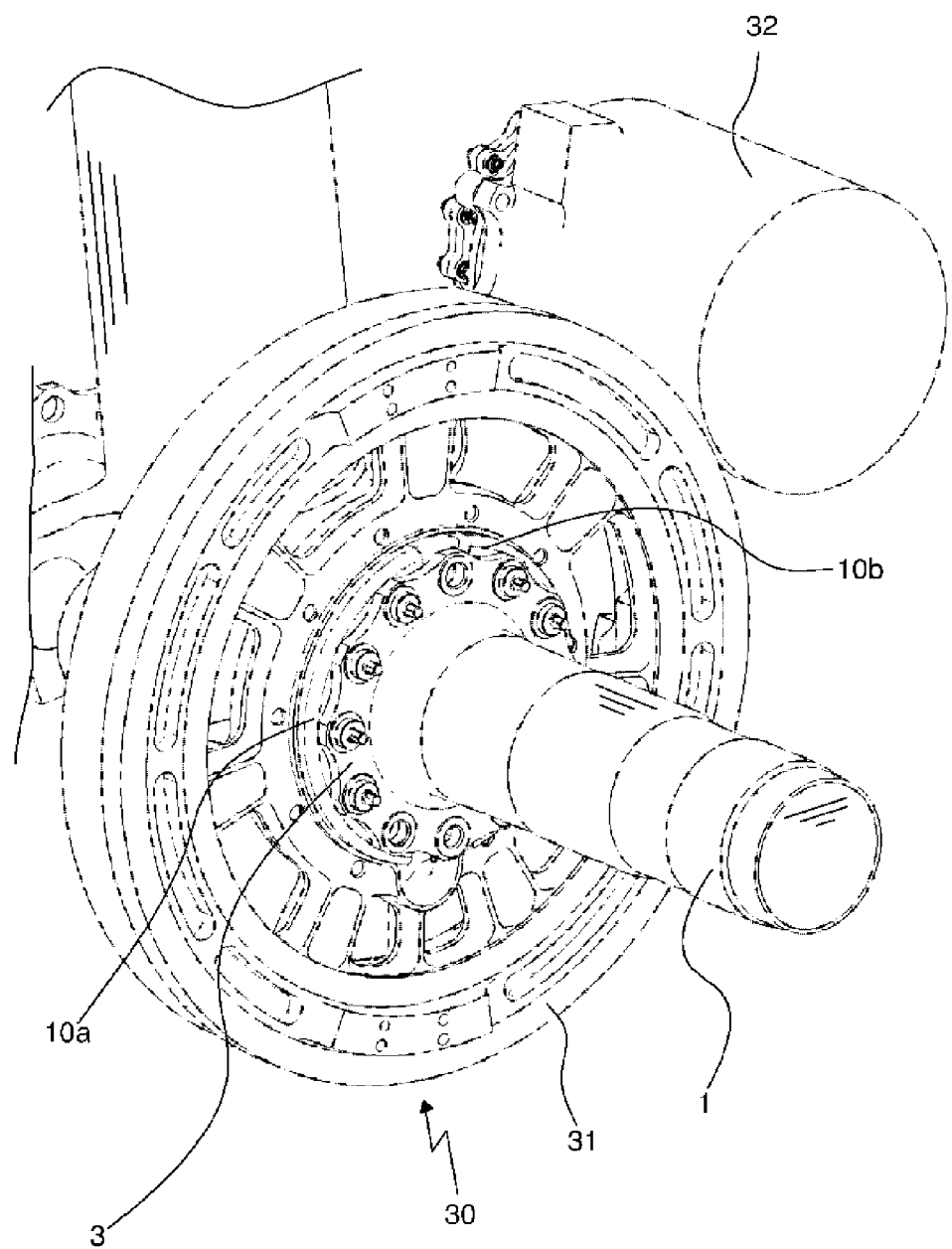
FIG. 5 is a perspective view of the undercarriage as fitted with its support and with a member for driving the wheel.

FIG. 5 shows a rotary drive member 30 being mounted, the drive member in this example comprising a ring-shaped casing 31 that is fitted on the outer collar of the support 10. There can be seen the motor 32 of the rotary drive member 30 that is carried by the casing 31. By means of the support of the invention that is fastened to the rear face of the collar, the rotary drive member 30 can be fastened in removable manner, and can be presented as an option to airlines, including on existing undercarriages.

Figure 7:
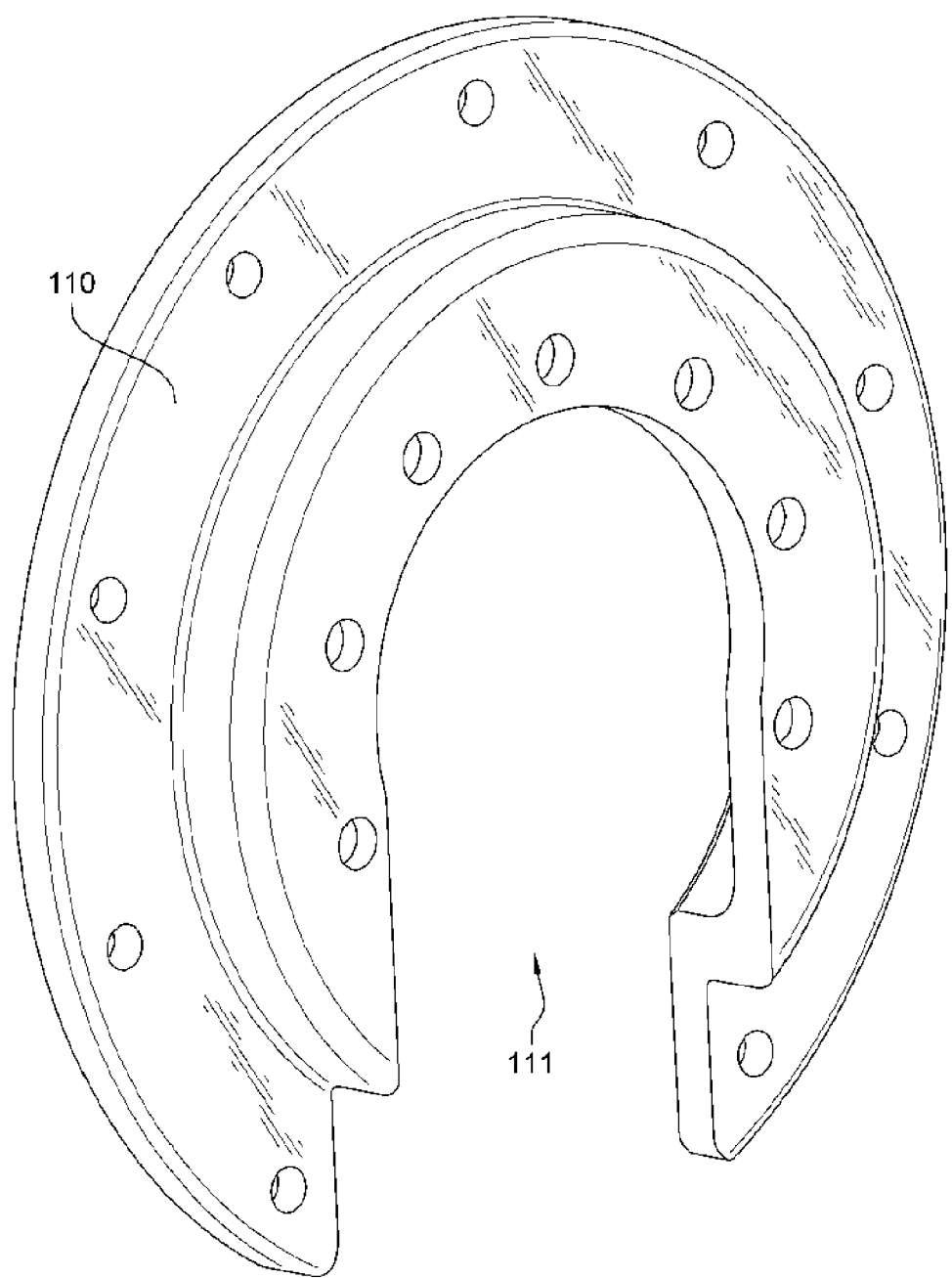
FIG. 7 is a perspective view of a support in a second embodiment of the invention.
Figure 8:
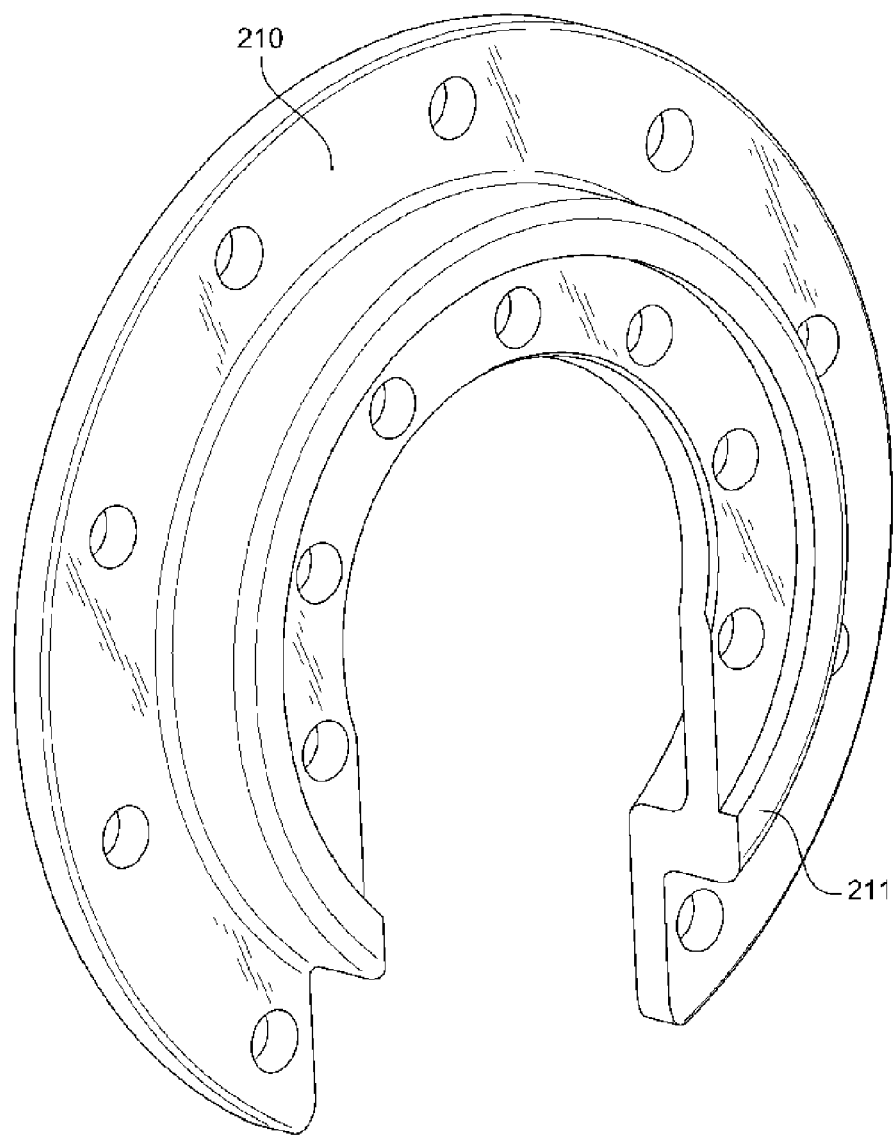
FIG. 8 is a perspective view of a support in a third embodiment of the invention.
Figure 9:
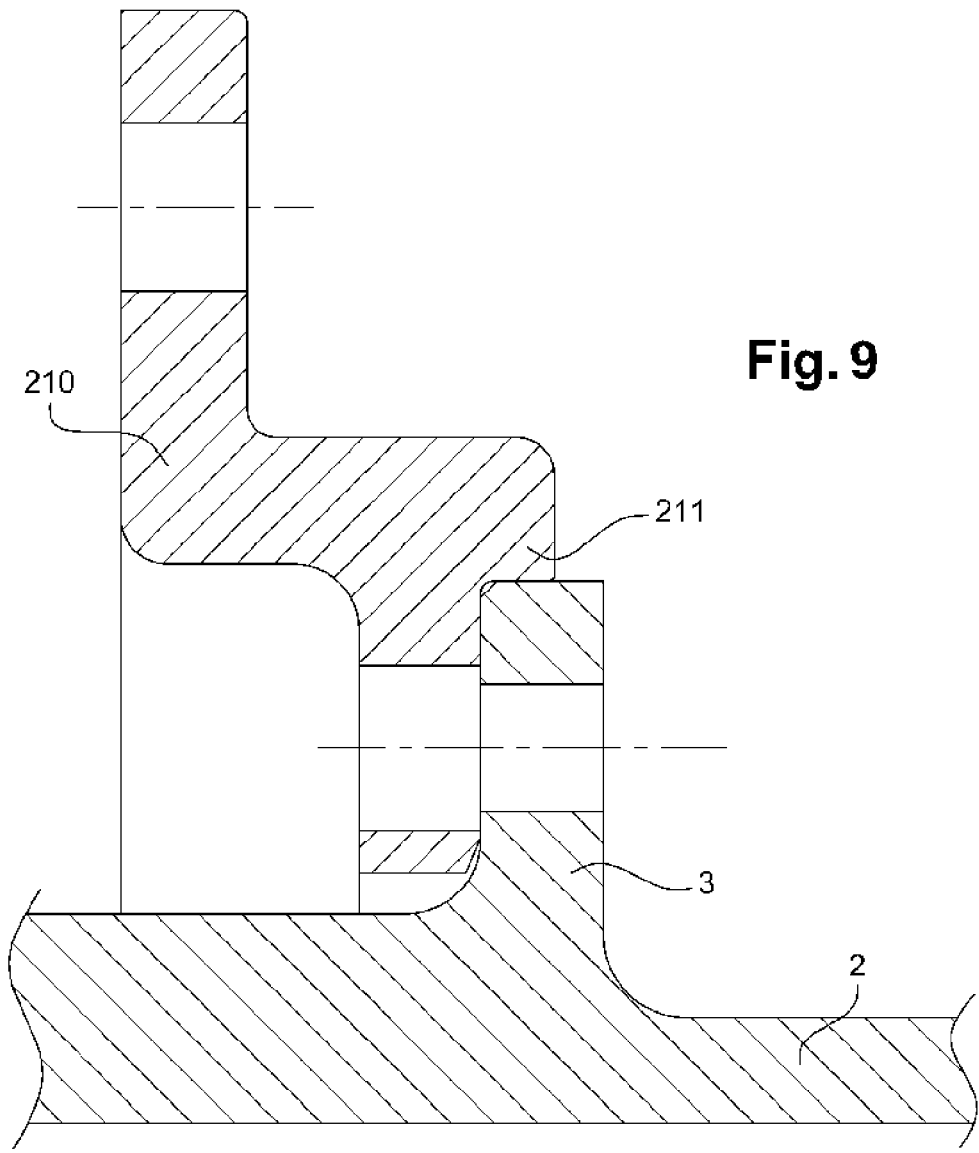
FIG. 9 is a section view of the FIG. 8 support in place on the torque plate.

In a second embodiment of the invention, as shown in FIG. 7, the support of the invention 110 comprises a single piece that presents an opening 111 enabling it to be put into place against the inside face 3int of the torque plate 3 fitting astride the portion of the axle that extends between the leg of the undercarriage and the torque plate. As in the first embodiment, the support 110 is pierced to receive fastener bolts. In a third fastener embodiment shown in FIGS. 8 and 9, the support 210 likewise comprises a single part. However the support 210 includes a collar 211 that projects in order to enable the support 210 to be centered on the periphery of the torque plate.

The invention is not limited to the above description but covers any variant coming within the ambit defined by the claims.

The invention claimed is:

1. A method of mounting an aircraft wheel rotary drive member (30), comprising a motor (32), onto an undercarriage having an axle (1) that carries the aircraft wheel and that is provided with a torque plate (3) having an outside face against which a brake is fitted, the rotary drive member (30) being operative to drive the wheel rotatably around the axle, the method comprising:
   fitting a support (10; 110; 210) that bears against an inside face of the torque plate opposite from the outside face of the torque plate, and
   fitting the aircraft wheel rotary drive member on the support.

2. The mounting method according to claim 1, wherein the support (10) comprises two half-supports, each of which is fitted against the inside face of the torque plate in order to be bolted thereto.

3. The mounting method according to claim 2, wherein the support (210) has a collar (211) for centering the support on a periphery of the torque plate.

4. The mounting method according to claim 1, wherein the support is fastened on the torque plate by using at least one bolt (20) inserted in an orifice of the torque plate and having a threaded bolt shank (21) on which a nut (22) is fitted to clamp together the support and the torque plate between a head (25) of the threaded bolt shank and the nut.

5. The mounting method according to claim 4, wherein the threaded bolt shank includes a smooth portion (23) for centering the threaded bolt shank in the orifice of the torque plate.

6. The mounting method according to claim 5, wherein the head (25) of the bolt is received in a spot face of the brake with a small amount of circumferential clearance between the brake and the head of the bolt in order to position the brake relative to the torque plate.

7. The mounting method according to claim 1, wherein the support is made as a single piece (110; 210) and has an opening to enable the support to be put into place against the inside face of the torque plate.

8. The mounting method according to claim 1, wherein the brake is fitted only against the outside face.

9. The mounting method according to claim 1, wherein the rotary drive member is independent of the brake.

\* \* \* \* \*